Feb. 15, 1966 H. P. O. UNGER 3,235,173
AGITATING AND/OR FRACTIONING CENTRIFUGE
Filed July 24, 1961 6 Sheets-Sheet 1

INVENTOR.
HANS PETER OLOF UNGER
BY
Attorney

Feb. 15, 1966 H. P. O. UNGER 3,235,173
AGITATING AND/OR FRACTIONING CENTRIFUGE
Filed July 24, 1961 6 Sheets-Sheet 2

INVENTOR.
HANS PETER OLOF UNGER
BY

Attorney

Feb. 15, 1966 H. P. O. UNGER 3,235,173
AGITATING AND/OR FRACTIONING CENTRIFUGE
Filed July 24, 1961 6 Sheets-Sheet 3

INVENTOR.
HANS PETER OLOF UNGER
BY
Attorney

Feb. 15, 1966  H. P. O. UNGER  3,235,173
AGITATING AND/OR FRACTIONING CENTRIFUGE
Filed July 24, 1961  6 Sheets-Sheet 4

INVENTOR.
HANS PETER OLOF UNGER
BY
Attorney

Feb. 15, 1966 H. P. O. UNGER 3,235,173
AGITATING AND/OR FRACTIONING CENTRIFUGE
Filed July 24, 1961 6 Sheets-Sheet 5

INVENTOR.
HANS PETER OLOF UNGER
BY
Attorney

Feb. 15, 1966 H. P. O. UNGER 3,235,173
AGITATING AND/OR FRACTIONING CENTRIFUGE
Filed July 24, 1961 6 Sheets-Sheet 6

INVENTOR.
HANS PETER OLOF UNGER
BY
Attorney

United States Patent Office 3,235,173
Patented Feb. 15, 1966

3,235,173
AGITATING AND/OR FRACTIONING
CENTRIFUGE
Hans Peter Olof Unger, Halsingehojden 11,
Stockholm, Sweden
Filed July 24, 1961, Ser. No. 128,336
Claims priority, application Sweden, July 28, 1960,
7,301/60
13 Claims. (Cl. 233—17)

The present invention presents a way to obtain intermittent or continuous double rotation of mixed solid and liquid material or only mixed liquids. The invention shows a form of the device, as a centrifuge.

Agitation, i.e., the handling of the named types of material, using centrifugal force, has been known and practiced for a long time, for the laboratory and scientific analyzing of materials, as with industrial procedures, for example, for separation of particles suspended in the named fluid.

Previously, however, it has only been possible to produce the named agitation by using centrifugal force in one direction. Particularly in the laboratory and/or scientific analyses this means a circumscription of the possibilities to obtain quickly and effectively the desired results. Manual or other technical procedures must often be resorted to, to complete the work, which can be attained by centrifugal force in one direction. The named manual procedures mean that the whole investigation process becomes awkward and time wasting.

By the use of the method and device of this invention, it is entirely possible to eliminate the above named disadvantages and also to open new possibilities for scientific and industrial procedures using agitation of the named types of materials.

The method according to the invention is characterized by the fact that material of the named type is first introduced into one or several containers, whereupon this or these containers are placed in the centrifuge head radially, or not radially, at the same or different distances from the centre of the centrifuge head, with or without central connection to the containers, or between the containers. The method is also characterized by the fact that during the continued rotation of the centrifuge head each container is brought to rotate about its own axis, to produce centrifugal force in two different directions, brought about partly by the centrifugal force of the centrifuge head's rotation, and partly by the centrifugal force of the containers' own rotation. Thus in each container the material is influenced by centrifugal force in two different directions at the same time, whereupon turbulent streams build up in the material in the container, when it is rotated intermittently, and fractioning of the material is achieved when the container is rotated continually.

The device, using the principles of the invention, when attached to a centrifuge, is primarily characterized by the fact that each container is rotatably positioned on the centrifuge's rotatable head, so that the containers are able to rotate about their own axes, and each container is arranged to be rotated by means of a drive or friction device, working upon it.

The device is further characterized by the fact that the centrifuge head is formed with a concentric opening or cavity at its periphery, of which the bottom is arranged at a level under the containers' outer limiting surfaces, so that some part, between the containers' two ends, is available for the action of the drive or friction device, which is entirely unconnected with the centrifuge head, so that the drive or friction device does not hinder the rotation of the head.

It should be noted that with continuous rotation of the centrifuge head, and continuous rotation of the container the maximum stable double centrifugal force field is obtained when the container is placed in the centrifuge head in a horizontal and radial direction, i.e. that the rotation axes of the centrifuge head and the container are at right angles. The combined centrifugal field resulting from this arrangement has the effect, that a particle which is in the named field takes a course towards the periphery of the container and the centrifuge head. Examples of such container positions are shown in the drawings in FIGURES 11, 12 and 13. It should be mentioned that there is no technical difficulty involved in placing the containers shown in FIGURES 3, 4, 5, 6, 7 and 10, in a horizontal and vertical direction on the centrifuge head, if it should be so desired.

With all other spatial positions of the container on the centrifuge head and continuous rotation of the centrifuge head and simultaneous continuous rotation of the containers, a particle in the containers is exposed to a pulsating centrifugal field.

This happens when a particle is thought to be at a point on the inner wall of the container which is rotating about its own axis, and this point at one moment is nearer the centrifuge head's periphery, because after half a revolution it is nearer the centre of the centrifuge head. There is thus produced a mixing of the material.

The device is further characterized by the fact that in the middle of the centrifuge head is provided an automatic liquid measuring and dividing device, which, by means of tubes such as flexible tubes or the like, is arranged in connection with the containers so that the measured liquid quantities can be introduced into all the containers.

The method, and a number of modifications shall be further described below in connection with the annexed drawings.

Washing, according to the earlier known procedures, requires that the cells be suspended in the washing liquid in a centrifuge tube, which is then placed in an ordinary centrifuge, and the cells are centrifuged down, then the tube is removed, the washing liquid is pipetted off, and new liquid added with a pipette, or the like. The deposited cells are then re-suspended, and replaced in the centrifuge to be centrifuged down again. The centrifuge tube containing the cell specimen must thus be manually moved several times.

This always means a latent risk of confusing the tubes, especially since the process must be repeated four or six times for each separate specimen.

In FIGURES 1, 2, 7 and 8 is shown the rotatable centrifuge head, which is made with a ring-like cavity 2, which is open upwardly. In the middle of the head 1 is an upwardly opening cavity, of which the diameter can be of a size so that the tubes 6 can run diagonally downward towards the periphery. The opening has a fixed or removably automatic measuring and dividing device for liquids 4, from which extend a number of emptying channels 5, 5' to which are attached tubes which can be flexible tubes 6, 6', which are arranged so that their free ends emerge in tubelike containers 7, 7' which are radially placed in the centrifuge head 1 with their openings directed towards the centre of the head 1. At the periphery of the head 1 are pockets 8, 8' in which the bottoms of the containers 7, 7' fit, so that they are rotatable about their longitudinal axes.

The mouths of the containers 7, 7' are introduced into diagonally directed holes 9, 9' which are radially placed in the head 1 between the cavities 2 and 3. These holes 9, 9', make together with the pockets 8, 8' directed courses for the container 7, 7' so that they can be rotated in these positions by an outside force. The containers 7, 7' are able to be introduced into these positions from the periphery of the head 1 through the holes 10, 10'.

The containers 7, 7' are intended to contain some material, e.g. blood, which is to be agitated, i.e., treated by the aid of centrifugal force. When it, as earlier mentioned, is required to wash the blood using this agitation, a number of times, then measured quantities of wash liquid can be automatically introduced into the containers 7, 7' from the measuring and dividing device 4 via the tubes 6, 6'.

To make possible the rotation of the containers 7, 7' about their longitudinal axes, a drive or friction device is arranged to, during the rotation of the head 1, work against outer surfaces of the containers 7, 7'.

Figure 1:
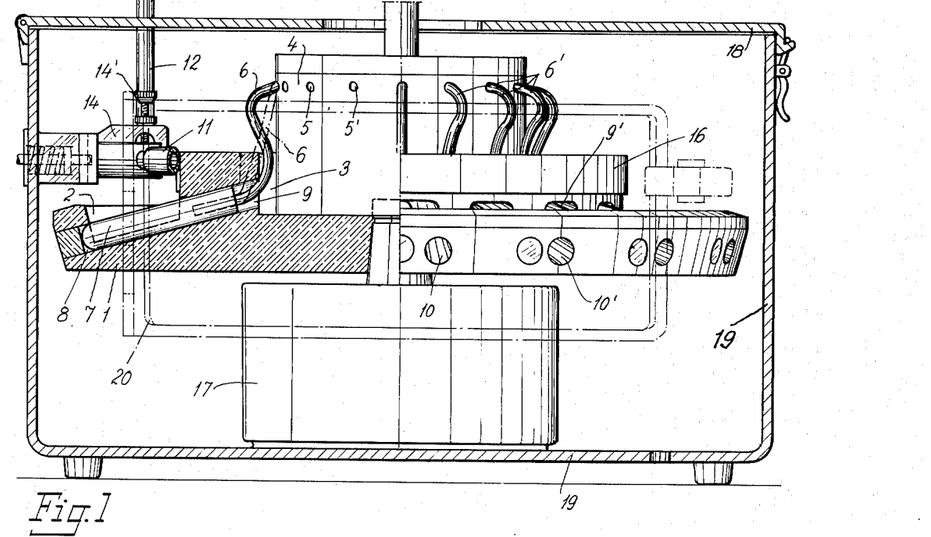
FIG. 1 shows schematically an embodiment of the device, with certain parts in vertical section.

In this embodiment the drive or friction device consists of an elastic arm which can be lowered onto the outer sides of the containers 7, 7', the same being in the form of a flexible tube 11, or the like, which by means of an arm 12 is arranged to be manually moved towards and away from the containers. During intermittent agitation by the tube 11, or by a ring 13 of elastic material, shown in FIG. 7, such ring is arranged to be moved towards or away from the surfaces of the containers 7, 7' during continuous agitation. The arm 12, which is attached to the bracket 14, is by means of an adjustable bearing 14', arranged to bring the tube 11 to press against the containers 7, 7' with the desired pressure during the rotation of the head 1. The arm 12 is brought back to its original horizontal position by a spring 14'', or is locked in the agitation position by the locking device 14''', shown in FIG. 8. To the arm 12 is firmly fixed a brake lining 15, which is designed to be brought with adjustable pressure to press on a brake-rim 16 vertically fixed to the head 1, through which the rotation of the head can be gently slowed down. The entire agitation mechanism formed according to 14 for intermittent agitation, or according to 13 for continuous agitation are exchangeable or removable by means of a bayonet joint which in its turn is secured to the side wall of container 17 which is used in FIGURES 1, 2, 7 and 8. The whole device which is shown in FIG. 1 including the centrifuge 17 can be contained in the container 19, which is supplied with a lid 18, and which can be supplied with a vertical hatch or door 20 for the placement and removal of the containers 7, 7'.

In FIGURES 3, 4, 5 and 6 are shown several different modifications of the arrangement for the insertion of the containers 7, 7' into the periphery of the head 1, constructed so that the placement of the containers, or centrifuge tubes, is permitted from different peripheral directions, entirely according to accessibility.

Figure 3:
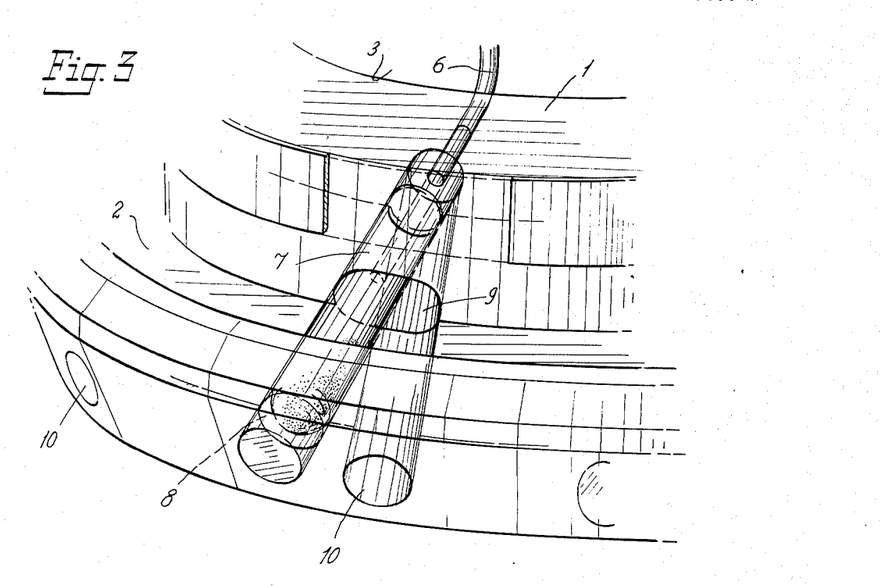
FIGS. 3, 4, 5 and 6 show several modifications of the device for the containers' (here centrifuge tubes') placement from the periphery of the centrifuge head.

In the modification shown in FIG. 3 a container 7 is first inserted through a hole 10 at the periphery of the head, and then up into a hole 9 between the cavities 2 and 3, whereupon the mouth of the container 7 is placed over the free end of the liquid introduction tube 6, if the tube 6 is long enough to enter a certain distance into the conainer. After this the bottom end of the container 7 is placed in the pocket 8, of which the bottom is flat so that the rounded end of the container 7 contacts this flat bottom at a point, and therefore can be rotated. The rotation of the centrifuge head 1 prevents the upward displacement of the container 7, by centrifugal force.

Figure 4:
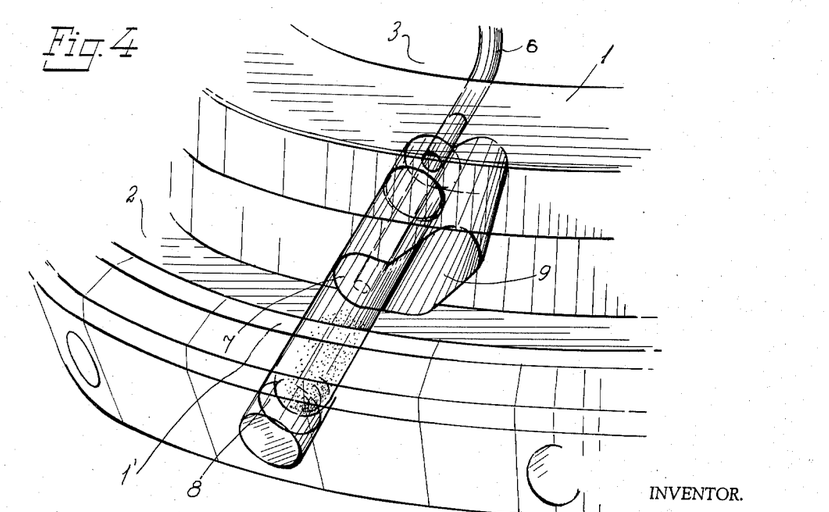

In the modification shown in FIG. 4 the mouth of the container 7 is first introduced into the hole 9 between the cavities 2 and 3, and after this the bottom part of the container which is above the peripheral edge 1' of the head 1 is lowered obliquely to the left, into the pocket position 8.

Figure 5:
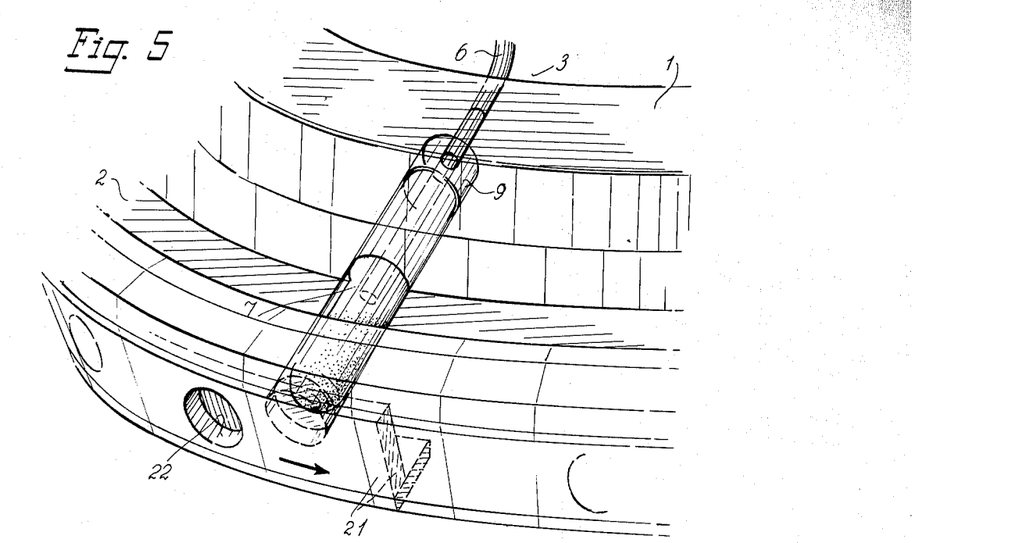

In FIG. 5 is shown a modification where the centrifuge head 1 has a rotatable ring 21 at its periphery. In this ring 21 are provided a number of holes 22 through which the containers 7, 7' can be introduced. After the insertion of a container 7 in a hole 22, the container 7 drops a little, and consequently comes to rest with the lower part of its bottom against the ring 21, i.e., the lower edge of the hole 22 in the ring 21. Thus a container can not fall out of position once it has been inserted, even though the hole 22 has not been closed by the turning of the ring 21. On the rotation of the ring 21 the bottom point of the container 7 comes to rest against the inside of the ring 21 and is in position. The removal of the container 7 is managed in the opposite way.

Figure 6:
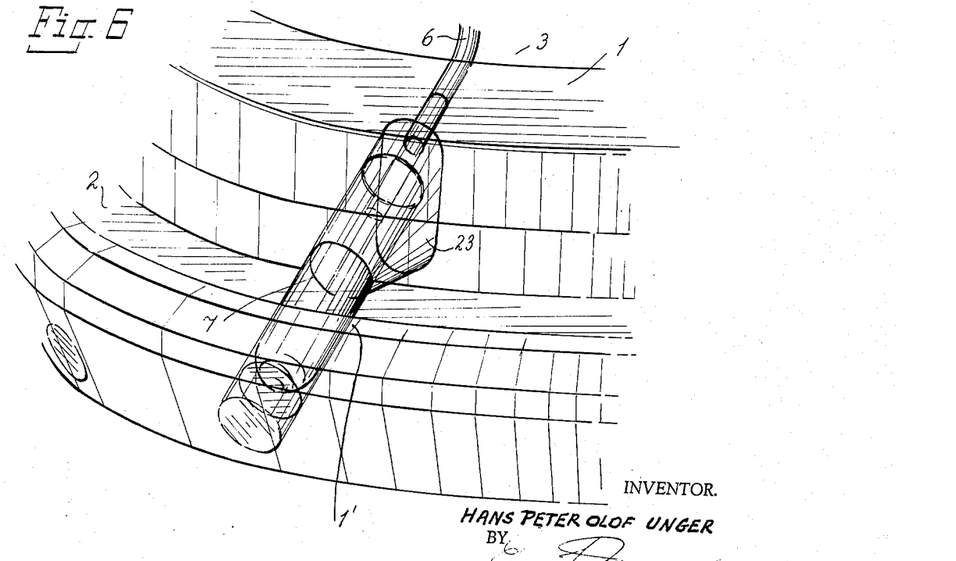

In the modification shown in FIG. 6 each container 7, 7' is introduced mouth first over the peripheral edge 1' of the centrifuge head 1, down into a space 23 between the cavities 2 and 3, and thereafter is positioned in the manner shown in FIGURES 3 and 4.

The device described above operates in the following way:

The centrifuge tube 7, 7' containing the few drops of blood to be tested, is placed in a numbered division (see 9 and 23), on the centrifuge head in which position the tube remains during the whole washing procedure, thereby saving time, and avoiding confusing the tubes.

A certain quantity of liquid, in this case, sterile physiological saline, is added to a specially constructed measuring and dividing device in the centre of the head, which is divided into the same number of compartments as there are centrifuge tubes.

The measured liquid quantities are centrifugally forced through connecting tubes between the compartments and the centrifuge tubes on the periphery of the centrifuge head when it is rotated.

In order to resuspend effectively in the wash liquid (here saline), the particles (here blood cells) on the bottom of the centrifuge tube, the tubes are now rotated about their own longitudinal axes, upon which turbulent streams start up in the liquid, which as quickly as possible (here 5–10 sec.) effectively resuspend the sedimented particles (here blood cells). This is made possible by the drive or friction devices which can be brought into contact with, and rotate the centrifuge tubes, which lie unsupported along a great part of their length, with only a point in contact at the bottom, and a smooth support at their upper ends.

This construction of the centrifuge head makes possible continuous inspection of the transparent centrifuge tubes and their contents during centrifuging.

After the described agitation of the particles (resuspension) the drive or friction device is disconnected, then the centrifuge is accelerated to the desired speed and the particles are deposited.

A brake then stops the centrifuge head quickly and gently without causing (through too rapid deceleration) a disturbance of the centrifuge deposit.

Then new liquid is added to the measuring and dividing device as previously described. Because the liquid is supplied to the centrifuge tubes through a flexible tube, which stretches a certain distance into the centrifuge tube, the new wash liquid is now deposited by centrifugal force into the peripheral part of the centrifuge tube. With this the old wash liquid, which was in the centrifuge tube, is forced towards the mouth of the tube, and is thrown out from there, by centrifugal force, onto the centrifuge's surrounding splash wall, and can be collected in a container leading from the outlet of this barrier.

After use, the liquid containers in the measuring and dividing device, the centrifuge head (without centrifuge tubes), and the surrounding barrier, are rinsed with a suitable washing solution (or distilled water), after which the whole apparatus is sterilized.

Figure 7:
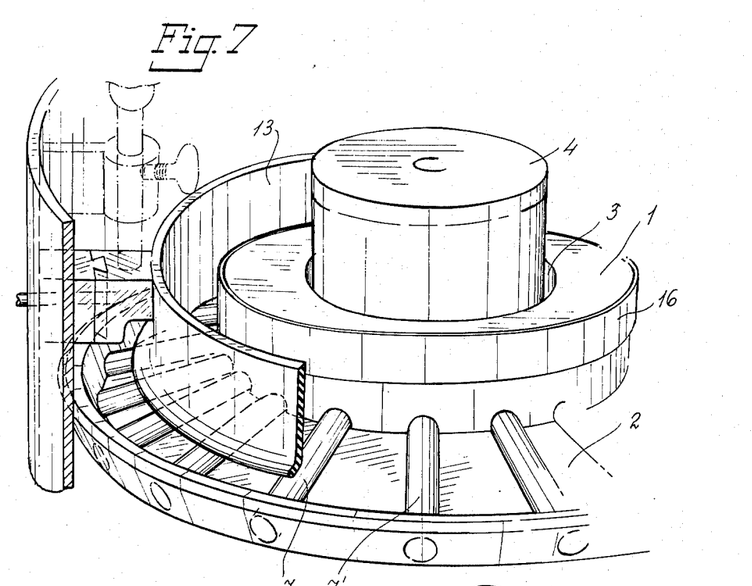
FIG. 7 shows the device according to FIGURES 1 and 2, however, with the addition of a ringlike friction device.

For continuous agitation the ringlike drive or friction device, shown in FIG. 7, is used. The elastic ring 13 causes all the containers (centrifuge tubes) 7, 7′ to rotate continuously when the ring 13 is in contact with the containers 7, 7′, and the centrifuge head 1 is rotating.

The containers 7, 7′ are presupposed here to contain, and/or by means of the measuring and dividing device 4 be supplied with, mixed solid and liquid material, or only liquid material. With this continuous agitation, there is built up in the containers 7, 7′ two differently directed, stable centrifugal fields, of which one comes from the centrifugal force of the head's 1 rotation, and the other from the continuous rotation of the containers 7, 7′ about their own long axes.

Figure 2:
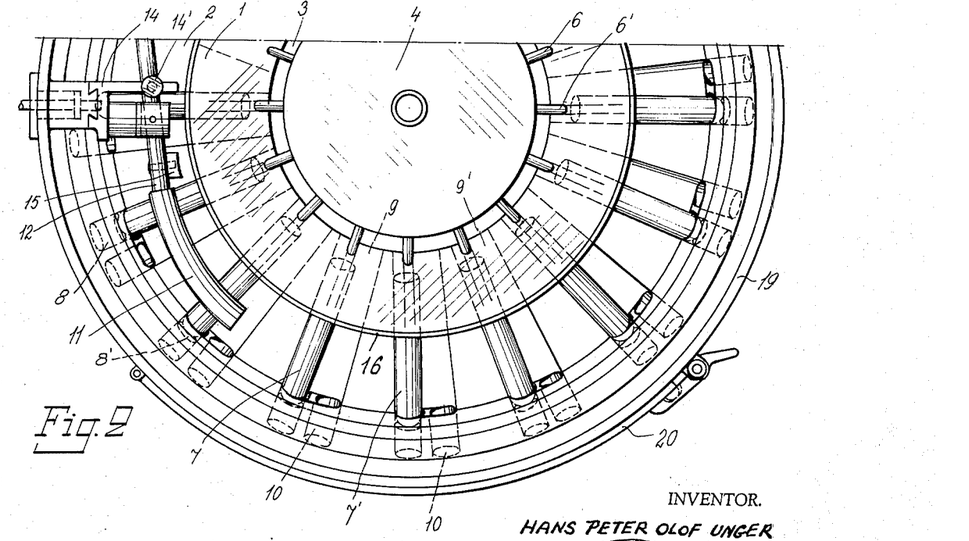
FIG. 2 shows the same modification without surrounding barrier's lid, as seen from above.
Figure 8:
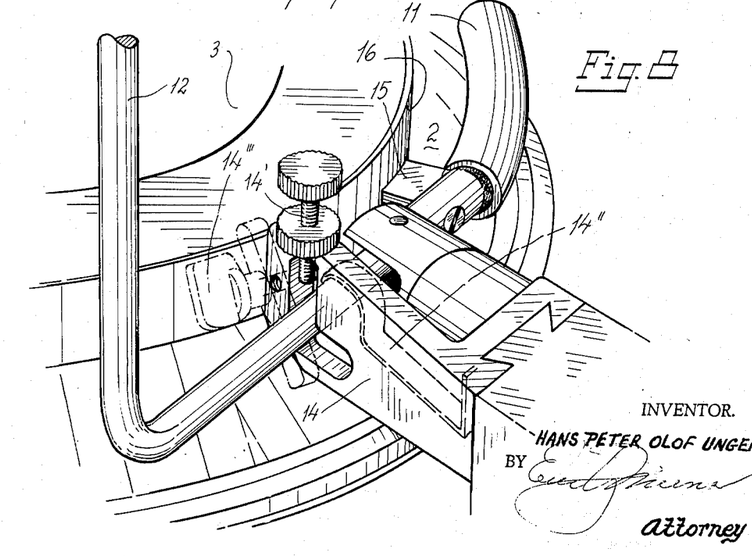
FIG. 8 shows more clearly the agitation and friction device, which is in FIGURES 1 and 2.

By lowering the arm 12 shown in FIGURES 1, 2 and 8, or by the intermittent lowering of the ring 13 shown in FIG. 7, an intermittent agitation of the containers 7, 7′ can be obtained, which causes two differently directed centrifugal fields, and these are not stable, but are instead particularly unstable. This causes turbulent liquid streams in the containers 7, 7′ which resuspend the particles deposited by the rotation of the centrifuge head 1.

The stable centrifugal field caused by the continuous agitation, brings about a fractioning of material in the containers 7, 7′. This fractioning is according to the specific gravity and form of the materials, and the relative strengths of the centrifugal fields. The named material fractioning and its meaning in different applications shall be further described below in conclusion to the different modifications of the device according to the invention.

Figure 9:
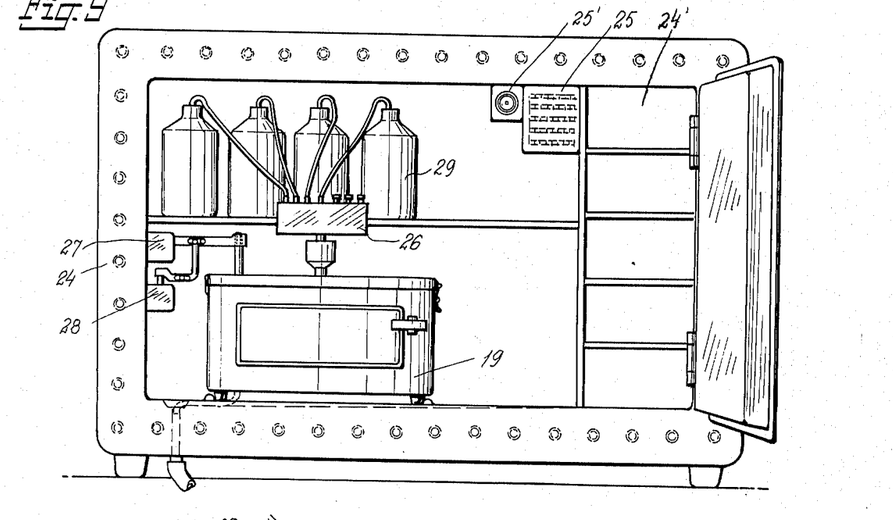
FIG. 9 shows the whole device according to FIGURES 1, 2, 7 or 8, built into an incubator or refrigerator, with the arrangements for entirely automatizing the whole process.

If necessary the whole machine can be placed in, or built into a constant temperature incubator or refrigerator 24, see FIG. 9, with incubation space 24′.

The whole method of procedure can be entirely automatized. An example of this shown in FIG. 9. The possibility of the processing being under precisely controlled temperature, and completely sterile is of great importance, specially with reference to medical laboratory technology e.g.—blood, cells, and the like.

By means of an automatic adjustment device 25 the whole process can be pre-set: by which for example electrical impulses in certain time periods go to the regulators 26, 27, and 28 for the different functions, of which can be mentioned, the introduction of liquid from the containers 29, braking of the centrifuge head, and intermittent or continuous agitation. 25′ demonstrates in addition, a temperature regulating mechanism.

Figures 10, 14A, 14B:
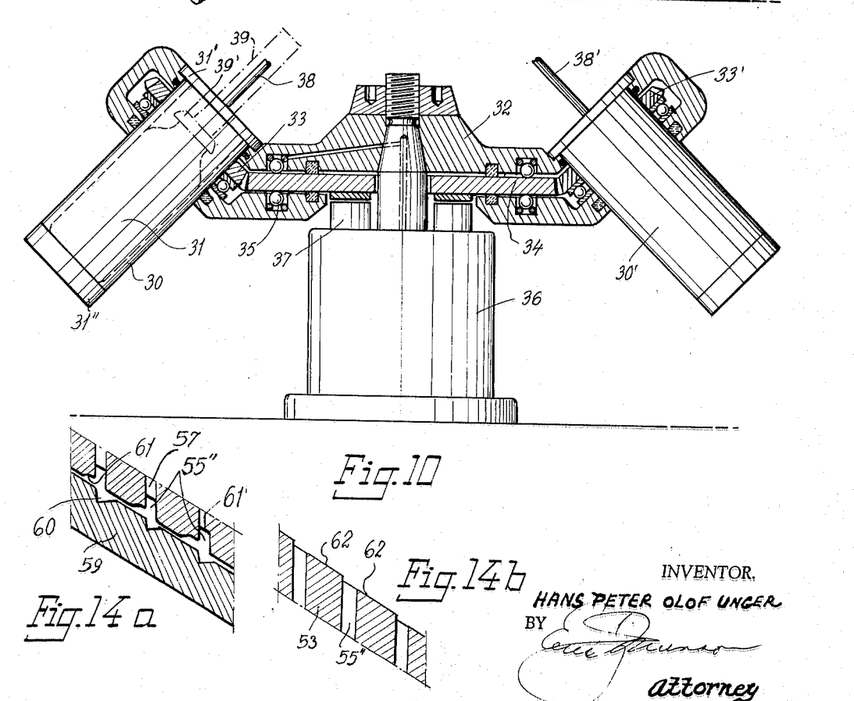
FIG. 10 shows schematically another modification of the device for larger liquid or suspension volumes partly in vertical section.
FIG. 14a shows schematically in vertical section a part of a centrifuge container and a modified particle spreader.
FIG. 14b shows schematically in vertical section a part of a modified centrifuge container.

The modification of the device shown in FIG. 10, is intended for larger quantities of liquid or suspension where a few, e.g. four large containers 30, 30′ are used.

In each container 30, 30′ the liquid can either be directly introduced, or in the containers 30, 30′ could be placed inner containers 31, 31′, into which the liquid can be introduced. These inner containers 31 could be removed or set in from the periphery of the centrifuge head 32, or from its centre, through the removable covers 31′, 31″ at the containers 30, 30′ central or peripheral end. Around each container 30, 30′ is an immovable cogbelt 33, 33′, the teeth of which are coupled to a suitable cog-wheel 34, which can be rotated in the head 32 by means of ball-bearings or roller-bearings 35. The cogbelts' housings can be supplied with a lubrication system and further supplied with suitable gaskets shown in FIG. 10. In the centrifuge's base 36, are adjustable brakes 37, working on the cog-wheel 34 which could function by clutch plates e.g. magnetic type braking. When the head 32 rotates and the brake system 37 does not influence the cog-wheel 34, then the head 32 is free. Then the cogwheel 34 does not influence the cog-belts 33. This means that the containers 30, 30′ do not rotate about their longitudinal axes, only that the containers 30, 30′ rotate with the centrifuge head 32. When the brake systems 37, 37′ are brought to influence the cog-wheel 34, then the speed of its rotation is braked with respect to the speed of the rotation of the head 32, which means that the cog-wheel 34 drives the cog-wheels 33, 33′, and thus the containers 30, 30′, so that these are brought to rotate about their own long axes. The more that the rotation of the cog-wheel 34 is braked, the quicker the containers rotate about their long axes, naturally presuming that the head 32 rotates. When the cog-wheel 34 is entirely braked the containers 30, 30′ rotate with their greatest speed. The brake mechanism 37 cog-wheel 34 and cog-wheels 33, 33′ here replace the drive or friction device. Intermittent agitation of the liquid in the containers 30, 30′ or the containers 31 is obtained when the brake mechanism 37 is applied with varying pressure, or at intervals, to the cog-wheel 34. Continuous agitation is obtained when the brake mechanism 37 is applied with steady pressure for a proportionately longer time.

An automatic measuring and dividing device for liquids can be attached to the centrifuge head 32 which can, by means of tubes 38, 38′ or the like, in the way described above, be connected to the containers 30, 30′ or 31. In this way the measured liquid or particle suspension quantities can be introduced into the containers 30, 30′, and 31′. To evacuate the liquid from the containers 30, 30′ or 31′, out-flow tubes 39 are provided. These tubes 39 could suitably be concentrically arranged around the liquid introduction tubes 38, 38′. If the liquid is directly introduced into the containers 30, 30′ the out-flow tubes 39 can be permanently fitted onto the containers 30, 30′ but if the liquid is introduced into inner containers 31, then the named tubes 39 can be removably fitted to them, and for example tightened by means of a covering rubber washer 39′ which tightens and at the same time fixes the inner container through the screwing on of the lid 31′ or 31″.

By means of the described arrangement blood may be frozen for long periods or frozen blood can be thawed and washed.

The centrifuge in FIG. 10 is, in this case, adapted for a refrigerator, mainly in the same way as 24 in FIG. 9. The containers 30, 30′ chilled in this way with their inner containers 31 are rotated about their longitudinal axes at relatively high speed, and measured blood quantities (in glycerine media) are introduced through the introduction tubes 38, 38′. These spread in a thin layer on the walls of the inner containers 31. There they instantly freeze (avoiding harmful effect) to the temperature of the containers 31. In this way the containers 31 can successively be wholly or partly filled with frozen blood.

The centrifuge according to FIG. 10 is adapted for an incubator (or combined incubator and refrigerator) principally according to 24 in FIG. 9. The inner containers 31, containing the stored, frozen blood are placed for thawing in the incubation space 24', according to the principle shown in FIG. 9—or the inner containers 31 are placed directly into the containers 30, 30' where the contents in the previously mentioned containers are thawed stationarily rotating or flowed over by warmed liquid, if contained in a plastic bag (warm physiological saline is used if introduced directly in contact with the blood), which comes in measured quantities or continuously through the introduction tubes 38, 38' and out through the out-flow tubes 39. This method is used when a plastic film separates the blood from the warm liquid. Otherwise, when warmed pysiological saline is used directly to wash the cells, then repeated washing are carried out in the way shown in FIG. 10.

The applications of the function (of the embodiment of the device) shown in FIG. 10 and here described are principally the same as were given for the embodiments of the devices shown in FIGURES 1, 2, 7, 8, and 9. The only difference being that the embodiment of the device shown in FIG. 10 can deal wtih larger volumes.

Figures 11, 12, 13:
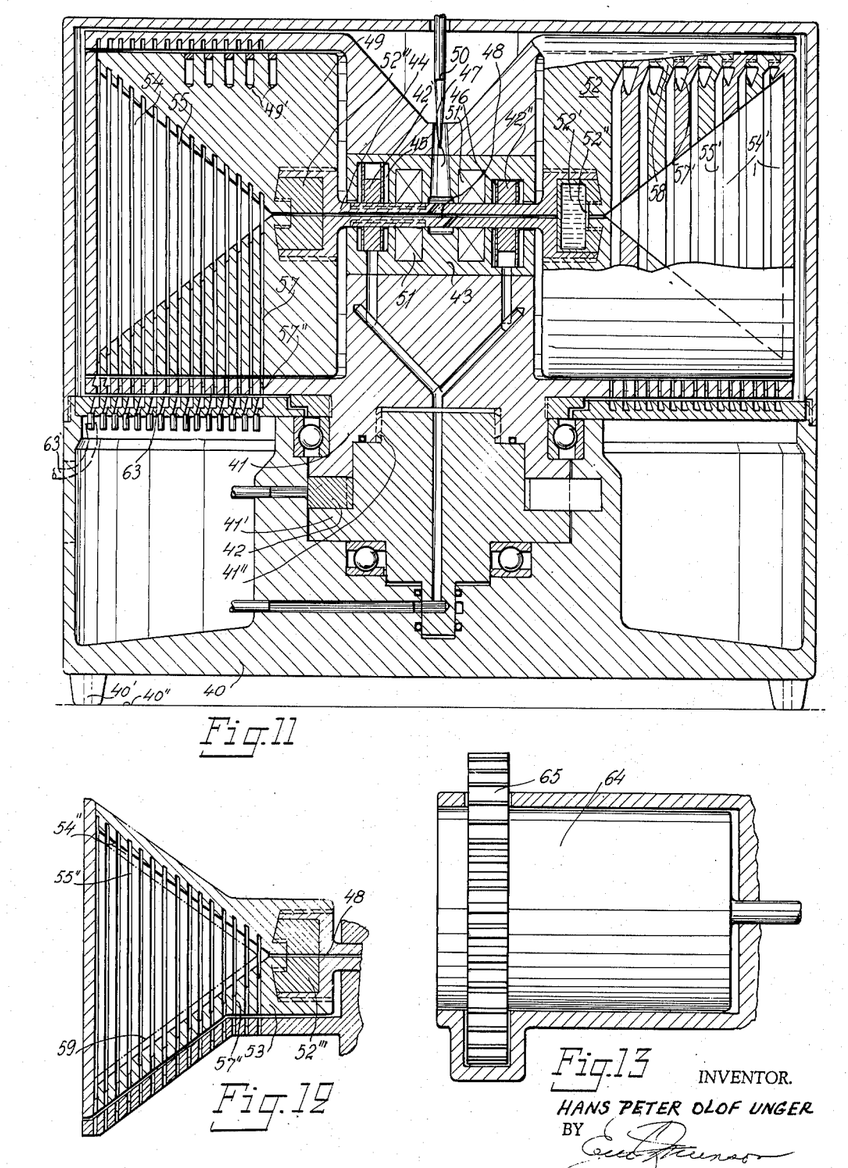
FIG. 11 shows schematically another modification of the device mostly in vertical section for solely continuous agitation, which can be used as continuous or not continuous two or one field centrifuging.
FIG. 12 shows schematically a modified type of centrifuge container, and parts of the rotor-body in vertical section.
FIG. 13 shows schematically further another modification of the device with parts of the centrifuge head and rotor-body in vertical section, and on the containers (in this case placed towards the rotor-body's centre, see FIG. 11) an attached cog-wheel.

In FIGURES 11 and 12 is shown another embodiment of the device specially designed for continuous agitation of suitable containers, in the form of low or high speed rotation of the centrifuge head (here called the rotor-body) and independently low or high speed rotation of the containers about their horizontal axes, in order to obtain the described fractioning of particles which are in, or are run into the named containers.

The base 40 in FIG. 11, which by means of the arrangement 40' is fixed to a sprung stand 40'' is formed so that it supports the rotor-body's upper part 41, and lower part 41'. Said parts are tightened and screwed to 41''. On the rotor body's lower part 41' is fixed an air or hydraulic motor 42, with its rotor-blades which rotate the whole rotor-body 41, 41' around its vertical axle. Also on the base 40 and rotor-body 41, 41' in- and out-flows and channels for the mentioned air or hydraulic motor 42, and for two further air or hydraulic motors 42' and 42'' of which the latter are symmetrically placed in the central body 43. The latter air or hydraulic motors 42', 42'' which rotate the horizontal axle 44 and which are placed in the motor housing 45, with tight, removable walls 46—could in this way accompany the rotating horizontal axle 44, which carries the containers, smallest side-movements, during all the rotor-body's 41, 41' rotation. The rotor-body 41, 41' is further supplied with suitable gaskets and radial or axial ball-bearings, shown in FIG. 11. In the upper rotor-body 41 and the central body 43 is a centrally placed, somewhat conical particle introduction channel 47, which enters the central space surrounding horizontal axle 44, which by means of short channels or a long central, horizontal channel 48 in the horizontal axle 44 is in connection with container 49, screwed into the named horizontal axle, with balance borings 49'. In the channel 47 is introduced an end-piece 50, which in its turn is connected to an adjustable introduction tube from a container, containing the particles to be fractioned. There are also symmetrically arranged in the central body two gaskets 51, 51'.

The centrifuge containers 49, 52, 52' in FIG. 11 or 53 in FIG. 12 can make possible several modifications, which can be adapted for the "two field centrifuge" shown in FIG. 11. All the centrifugal containers in question, have a common feature—that they are formed with a cavity, which can be cylindrical or conical, with the cone's base directed towards the containers central or peripheral end (in the named figures the centrifuge containers are shown with a conical form 54, 54', 54'' of which the base lies towards the peripheral end of the centrifuge containers)— and that in these cavities, there are cut, to equal or different depths circular or spiral tracks 55, 55', 55'' which either open towards the centrifuge containers outer walls by means of channels 57 or the like, or finish blind in pockets 57' in the centrifuge containers 52.

In the container 52 the tracks 55' and pockets 57' are formed by suitably made segments 58 which are tightly interlocked in the rotor-body's upper part 41. In FIG. 11 are tracks 57'' with peripherally oblique or raked walls, these tracks 57'' lie beside the out-flow channels. The tracks 57'' finish in short out-flow channels (equivalent to 57) which lie beside a track-plate 63, fixed to the base 40. This track-plate 63 is supplied with circular tracks with oblique or raked peripheral walls. Each track in the track-plate finishes in its respective out-flow channel, connected to an out-flow tube 63'', which can be caused to run out to a container.

In the cavities 54 of the containers 49, 52, and 33, 54', 54'' is a particle spreader 59, as in FIG. 12, fixed to the bottom of the centrifuge container. The particle spreaders 59 are formed so that they, according to the cavity of the centrifuge container, occupy a certain part of the cavity.

A form of particle spreader 59 is shown in FIG. 12, and is shown there by a dotted line showing the form of this particle spreaders and position.

In FIG. 14a is shown in section a part of the particle spreader 59 with circular plateaux 60, lying beside the circular tracks shown for example in FIG. 12 with their respective out-flow channels in the centrifuge container 53. Also is shown in FIG. 14 a deepening 61, going from the peripheral edge of the track 55'' which tapers peripherally towards the centrifuge containers' 53 inner wall. Further is shown a small calibre out-flow channel from the track 55'' which reduces the quantity of the over-flow.

In FIG. 14b is shown in section a part of the centrifuge container 53 in whose inner walls 62, the spaces between the tracks 55'' are stepped downwards towards the periphery.

FIG. 11 deals further with the adapted centrifuge container 52 of which the construction is described above, using the "two-field centrifuge" for interrupted operation. The space-filling body 52''' is set in, tightly screwed to the centrifuge containers 49 or 53, or constituting a part of them, with the inner container 52' which is formed with a peripheral hole with a covering membrane 52''. The inner container 52' is firmly screwed to the centrifuge containers 52 and replaces in this case the space-filling body 52'' on its place on the horizontal axis 44.

The function in this case is as follows: The inner container 52' is filled through the hole with a particle concentrate which is to be separated, this concentrate resting on the covering membrane 52'' then the inner container 52' is tightly screwed into the centrifuge container 52 (which in its turn can be supplied with a particle-spreader 59 and/or be filled with suitable liquid of a known viscosity). After this the centrifuge container is tightly screwed to the horizontal axle 44. When the centrifugal rotative force of the rotor-body 41, 41' has become great enough, then the membrane 52'' splits, and the particle concentrate is introduced into the centrifuge containers 52 cavity 54 by the named centrifugal force, where separation is obtained and the particle fractions are caught in the tracks 55', and in this case are collected in the pockets 57' after fractioning by the centrifuge container's 52 rotation about its own axis. After thee centrifugation is finished the centrifuge container 52 is unscrewed, and then the segments 58 are disconnected, upon which the particles are accessible.

FIG. 13 shows the principle of how the container's 64 rotation about its own axis can be obtained by means of of a turbine wheel 65 fixed to the container 64, which rotates either with the help of an airstream (or the resistance) of the rotation of the centrifuge head or rotor-body or the turbine wheel 65 of the container 64 are rotated by a gas or hydraulic motor.

Through the brake-mechanism, or a covering mechanism for the air source, the rotation of the container 65 can be stopped.

The invention is not limited to the form and modifications described above, and clarified by the drawings, but it can be varied a number of ways within the scope of the invention.

I claim:

1. A mixing apparatus comprising, a centrifuge having a head rotative around a vertical axis, a plurality of fluid containers disposed radially of the head and supported for rotative movement about axes located angularly in respect to the axis of rotation of the head, and a driving device mounted over the containers an arranged for raising and lowering movement and adapted when lowered to contact with the surfaces of the containers and cause rotative movement of them around their axes while they are being carried bodily by the head of the centrifuge.

2. A mixing apparatus as provided for in claim 1, wherein the driving device is in the form of a ring non-rotatively positioned above the containers and having its lower edge brought into contact with the containers simultaneously when the ring is lowered so that all of the containers will be simultaneously and continuously rotated around their respective axes while they are being bodily carried by the centrifuge head.

3. A mixing apparatus according to claim 1, wherein the driving device has its contacting surface arranged to contact with less than all of the containers at a time so that intermittent rotative movement of the containers around their axes is obtained.

4. A mixing device comprising, a centrifuge head including a peripheral ring and a centrally-elevated portion, the ring being provided with radial openings through which cylindrical containers are introduced from the outer side of the ring, said containers having open ends maintained in the centrally-elevated part of the head and directed toward the vertical axis of the head, said receptacles having portions of them exposed between the centrally-elevated portion and the ring for engagement by a driving means to rotate the containers.

5. A mixing device as provided for in claim 3, wherein the centrifuge head is provided with a vertically-directed ring-shaped brake surface, driving means for rotating the containers, and a brake arm carried by the driving means and applicable against the brake surface to gradually stop rotative movement of the centrifuge head.

6. A mixing device including a centrifuge head carrying a horizontally-disposed cog-wheel having teeth in engagement with those on other cog-wheels, containers mounted at the periphery of the centrifuge head, the last-mentioned cog-wheels being carried by said containers, brake means associated with the horizontal cog-wheel by means of which the rotation of said cog-wheel may be regulated or halted, whereby the cog-wheels borne by the containers will have their rotative speed-around their own axis increased with increased reduction of the rotative speed of the horizontal cog-wheel, inner containers provided within those which carry the cog-wheels, said inner containers being connected to means extending to a measuring and dividing device for liquid material, said device being located in the centrifuge head.

7. A mixing device including a centrifuge head rotative around a vertical axis, said head having a horizontally-arranged axle provided at its opposite ends with containers which are rotative by said axle, the axis of the axle being at right angles to the axis of the centrifuge head, drive means for rotating the centrifuge head and separate drive means for the containers whereby the rotative speed of the containers is independent of the speed of rotation of the head of the centrifuge.

8. A mixing device as provided for in claim 7, wherein the centrifuge head is provided with a central, vertically-directed entrance channel for liquid material, the axle having a horizontal channel, each end of the horizontal channel communicating with a cavity at the ends of the axle, whereby the liquid introduced through said channels will reach the cavities.

9. A mixing device as provided for in claim 8 wherein the cavities are of conical formation and have their apices directed toward the ends of the horizontal channel.

10. A mixing device as provided for in claim 8 wherein the cavities are provided with grooves in their walls.

11. A mixing device comprising, a centrifuge head and means for rotating the same, a liquid measuring dispenser mounted centrally of the head and rotated therewith about a vertical axis, a plurality of seats disposed radially of the head and laterally of the dispenser, the seats each receiving and holding a container, each of the containers having a mouth directed toward the dispenser, flexible tubes extending from the dispenser and entering into the mouths of the containers, and drive means operative above the containers and contacting with the outer surfaces thereof for rotating each container around its longitudinal axis while it is bodily carried by the centrifuge head during the rotation of the centrifuge head.

12. A mixing device as provided for in claim 11, wherein each of the containers has a rounded bottom and each of the seats has a flat bottom against which the rounded bottom of the container rests, and the drive means is a ring resting against all of the containers and causing said containers to rotate during the rotative movement of the centrifuge head.

13. A mixing device as provided for in claim 11, wherein the drive means is a flexible element mounted above the containers and movable to bring it into container-contact with a few of the containers at a time.

References Cited by the Examiner

UNITED STATES PATENTS

| | | | |
|---|---|---|---|
| 697,255 | 4/1902 | Kaczorowski | 233—25 X |
| 1,011,929 | 12/1911 | Ecaubert | 233—25 |
| 1,566,770 | 12/1925 | Packer | 233—25 X |
| 2,604,261 | 7/1952 | Silverstolpe | 233—26 |
| 2,783,938 | 3/1957 | Grela et al. | 233—26 X |
| 2,822,127 | 2/1958 | Sinn | 233—25 X |
| 2,834,541 | 5/1958 | Szent-Gyorgyi | 233—26 |

FOREIGN PATENTS 864,410  4/1961  Great Britain.

MARTIN P. SCHWADRON, *Acting Primary Examiner.*

JAMES S. SHANK, M. CARY NELSON, *Examiners.*

J. BELL, H. KLINKSIEK, *Assistant Examiners.*